US009877360B2

(12) United States Patent
Lee

(10) Patent No.: US 9,877,360 B2
(45) Date of Patent: Jan. 23, 2018

(54) MICROWAVE RANGE

(71) Applicant: Dongbu Daewoo Electronics Corporation, Seoul (KR)

(72) Inventor: Chang Ho Lee, Bucheon-si (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 576 days.

(21) Appl. No.: 14/133,265

(22) Filed: Dec. 18, 2013

(65) Prior Publication Data

US 2015/0129585 A1 May 14, 2015

(30) Foreign Application Priority Data

Nov. 11, 2013 (KR) ........................ 10-2013-0136278

(51) Int. Cl.
*H05B 6/64* (2006.01)
*H05B 6/78* (2006.01)
*A21B 1/36* (2006.01)

(52) U.S. Cl.
CPC .................................. *H05B 6/6411* (2013.01)

(58) Field of Classification Search
CPC ............... H01J 37/321; H01J 37/32165; H01J 37/32522; H01J 37/32458; H05B 6/6408; H05B 6/6411; Y10S 99/14
USPC ....... 219/753, 728, 389, 752, 732, 754, 767, 219/755; 99/421 P, 421 V, 421 H, 644, 99/352, 423, 41 A, DIG. 14; 126/338, 126/41 A; 198/800
See application file for complete search history.

(56) References Cited

U.S. PATENT DOCUMENTS

| | | | | |
|---|---|---|---|---|
| 3,232,247 A * | 2/1966 | Vaughan | A21B 1/26 | 198/800 |
| 4,717,802 A * | 1/1988 | Colato | H05B 6/6411 | 126/41 A |
| 5,837,980 A * | 11/1998 | Henning | A47J 36/027 | 219/732 |
| 5,996,572 A * | 12/1999 | Ilagan | A47J 37/0786 | 126/21 A |
| 2001/0025850 A1 | 10/2001 | Han et al. | | |

FOREIGN PATENT DOCUMENTS

| | | |
|---|---|---|
| CN | 1315630 | 10/2001 |
| FR | 1477820 | 4/1967 |
| JP | H0633673 | 9/1989 |
| KR | 19920008130 B1 | 5/1992 |
| KR | 19960004221 B1 | 3/1996 |
| KR | 19980003209 A | 3/1998 |
| KR | 20080043908 A | 5/2008 |

* cited by examiner

*Primary Examiner* — Quang Van

(57) ABSTRACT

A microwave range includes a main body having a cooking chamber therein; and a tray unit in the cooking chamber, in which the tray unit is configured to rotate food on a first plane and a second plane, the second plane being is orthogonal to the first plane.

14 Claims, 6 Drawing Sheets

MICROWAVE RANGE

CROSS-REFERENCE TO RELATED APPLICATIONS

This application is based on and claims priority from Korean Patent Application No. 10-2013-0136278, filed on Nov. 11, 2013, the disclosure of which is incorporated herein in its entirety by reference.

TECHNICAL FIELD

The present disclosure relates to a microwave range, and more particularly, to a microwave range (or oven) capable of simultaneously rotating a tray in vertical and horizontal directions.

BACKGROUND

Generally, a microwave range is a kitchen appliance configured to irradiate microwaves at a frequency of 2,450 MHz onto the food, thus cooking the food by dielectric heating (e.g., using frictional heat caused by the translational motion of molecules of water in the food).

The microwave range includes a main body that forms an exterior of the range, and an internal space of the main body is separated from a machine chamber, which is outside of a rectangular internal case of or in the main body.

Food to be cooked is placed on a tray that may rotate in a cooking chamber of the microwave range. The tray rotates by a motor that is below an outer surface (e.g., a bottom surface) of the cooking chamber. In the machine chamber, a magnetron oscillates a high frequency to radiate microwaves into the cooking chamber, and a high pressure transformer and a high voltage condenser apply a high voltage to the magnetron.

When the microwave range operates with the above-mentioned structure, the high frequency wave generated from the magnetron may radiate into the cooking chamber, and the high frequency wave is irradiated onto the food that rotates together with the tray to cook the food.

When food having a certain volume and/or height is placed on the tray, a deviation in radiation intensity between an upper portion and a lower portion of the food being cooked may occur. Therefore, food may not cook evenly or as desired.

SUMMARY

The present disclosure has been made in an effort to provide a microwave range capable of overcoming a deviation between an upper portion and a lower portion of food being cooked on a tray of the microwave range.

Embodiments of the present disclosure provide a microwave range or oven including a main body having a cooking chamber; and a tray unit in the cooking chamber, configured to rotate food on a first plane and a second plane, in which the second plane is orthogonal to the first plane.

The tray unit may include a first tray configured to rotate on the first plane; and a second tray configured to rotate on the second plane orthogonal to the first plane.

The second tray may be inserted into or placed onto the first tray. The weight or weight distribution of the second tray may balance the tray unit, thus, maintaining the first and second trays in an upright position.

The microwave range may further include a driving unit that drives the first tray and the second tray.

The driving unit may include a first driving device configured to rotate the first tray and a second driving device configured to rotate the second tray.

The first driving device may include a driving motor that provides power to the first tray; a driving shaft coupled to the driving motor; a first link having one end coupled to the driving shaft at a right angle; and a second link rotatably coupled to another end of the first link.

A pair of driving shafts, first links, and second links may be provided at opposite sides of an internal portion of the main body.

The microwave range may further include a bearing that allows the first link and the second link to rotate.

The second driving device may include wheels under the second tray (e.g., a peripheral edge of the second tray), configured to rotate the second tray; and a rotatable motor at or under one side of the second tray configured to provide a rotation power to the second tray.

According to embodiments of the present disclosure, the microwave range has a the tray unit that is capable of simultaneously rotating in a vertical direction and in a horizontal direction while maintaining the tray unit in an upright position, so that the deviation between the upper portion and the lower portion of the food being cooked decreases and improves the cooking result.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
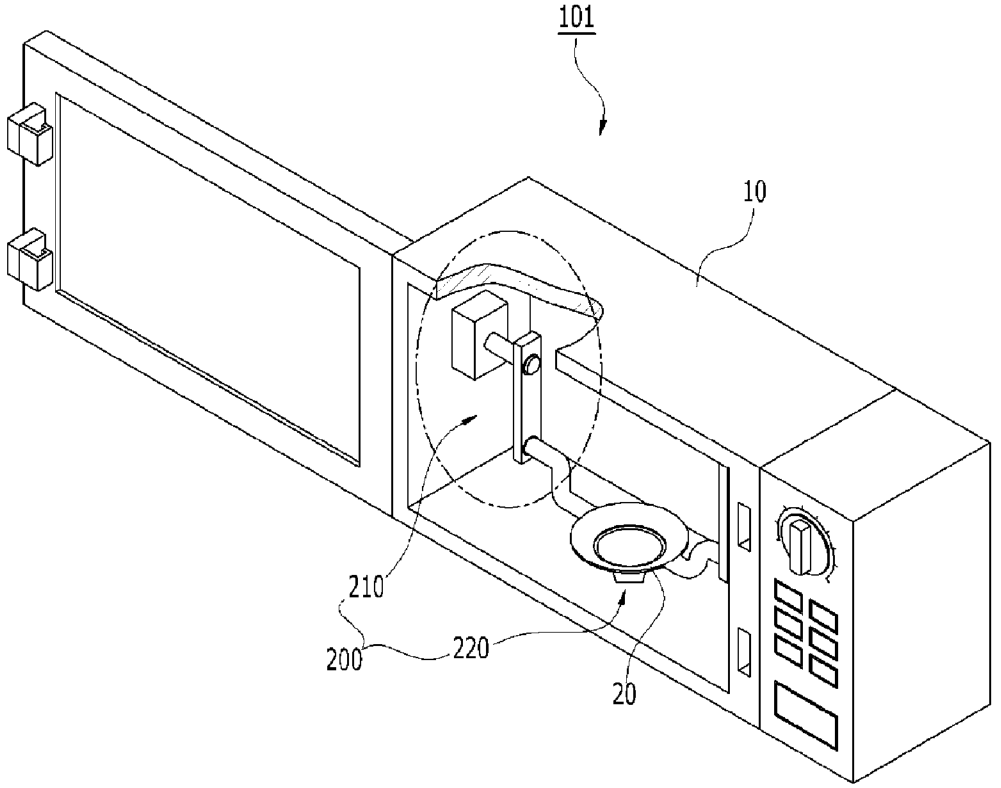
FIG. 1 is a perspective view illustrating an exemplary microwave range according to embodiments of the present disclosure.
Figure 2:
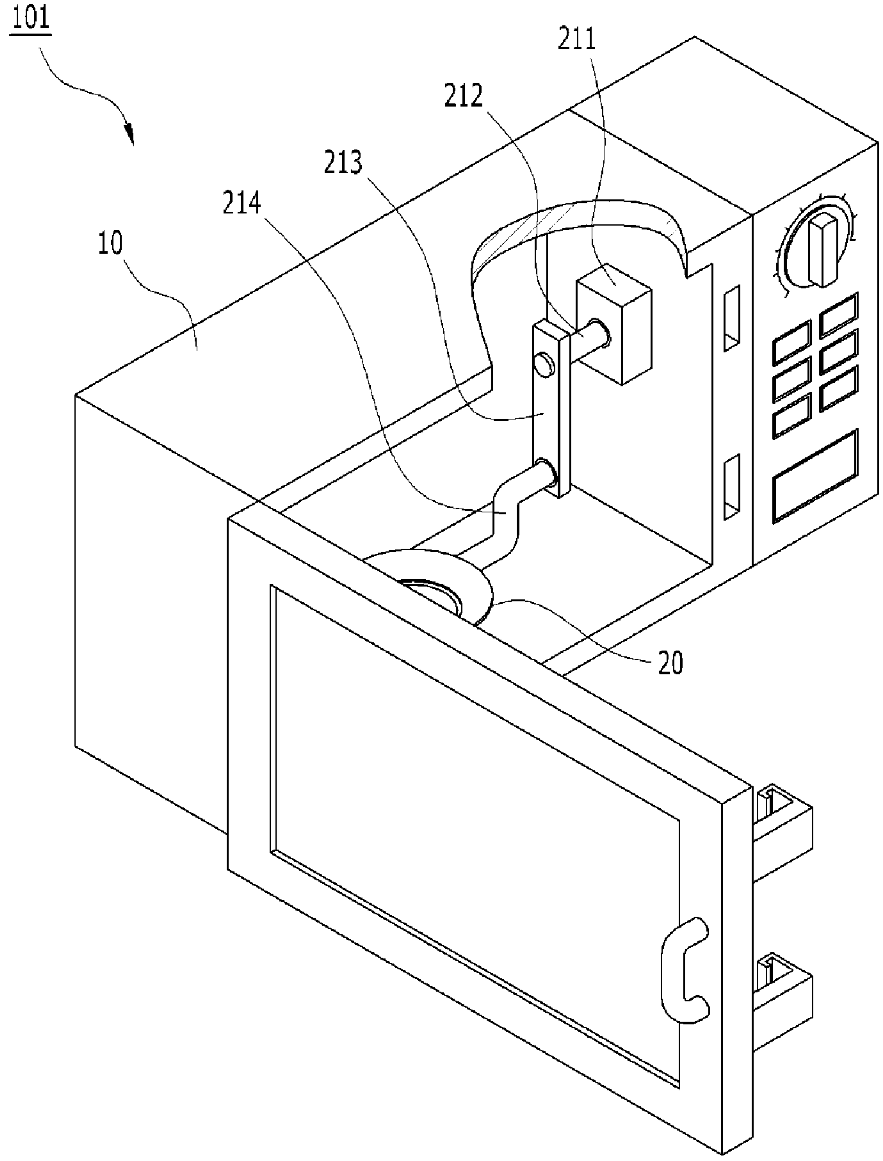
FIG. 2 is a perspective view illustrating an exemplary microwave range according to embodiments of the present disclosure.
Figure 3:
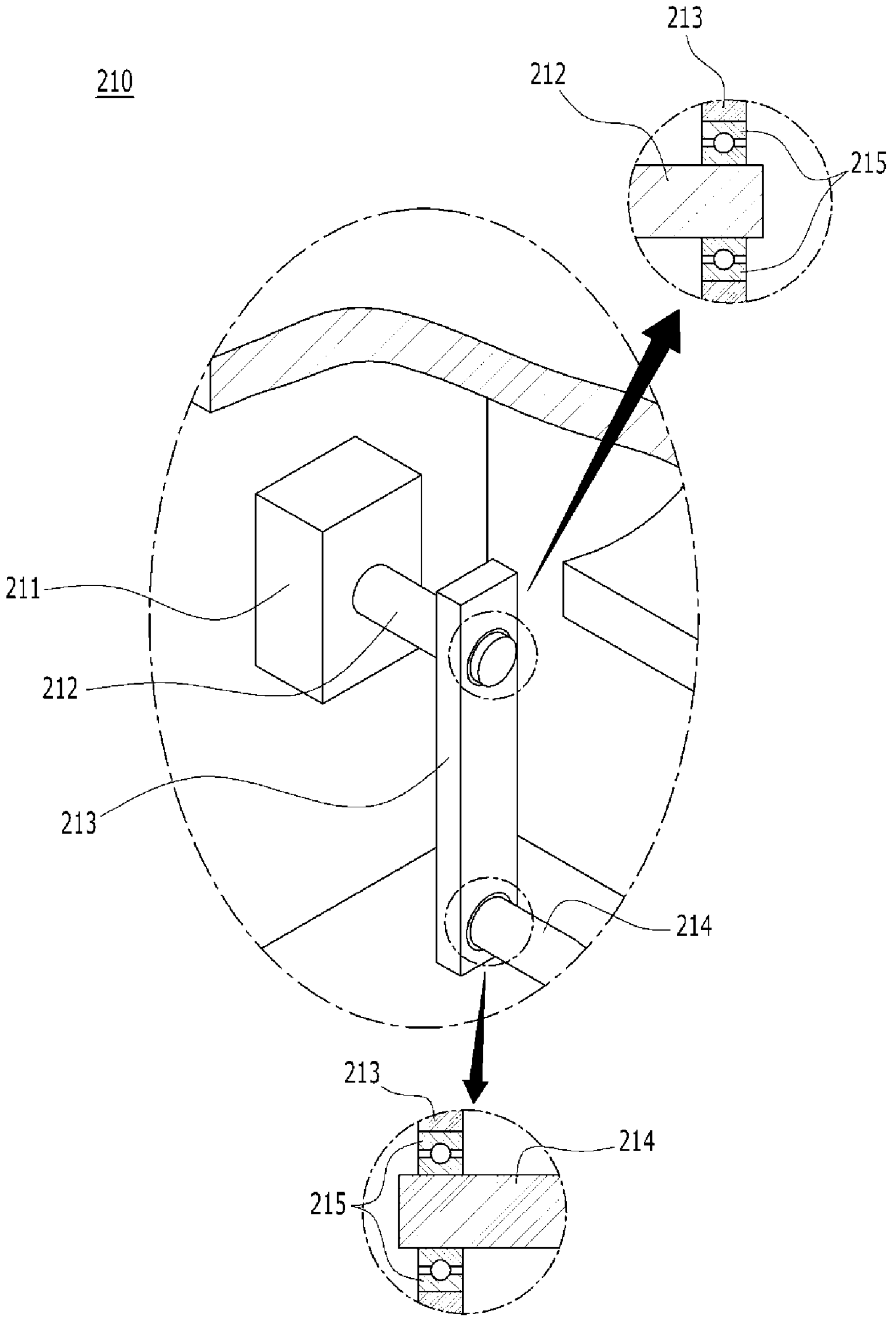
FIG. 3 is a partially enlarged view of an exemplary part of the microwave range.
Figure 4:
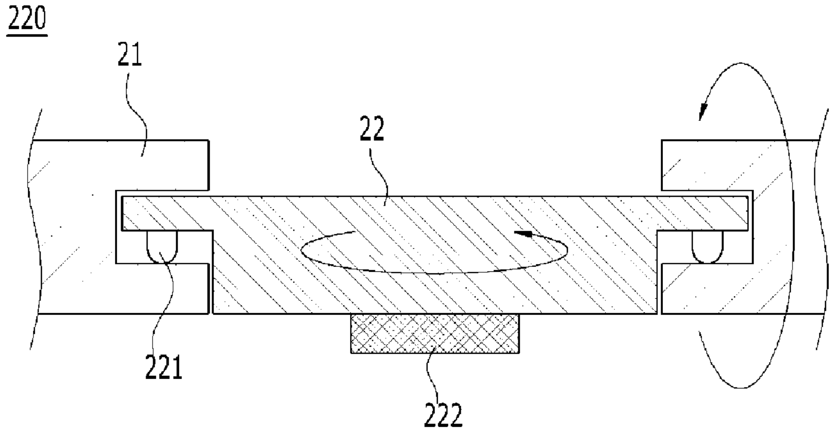
FIG. 4 is a partially enlarged view of an exemplary part of the microwave range.
Figure 5:
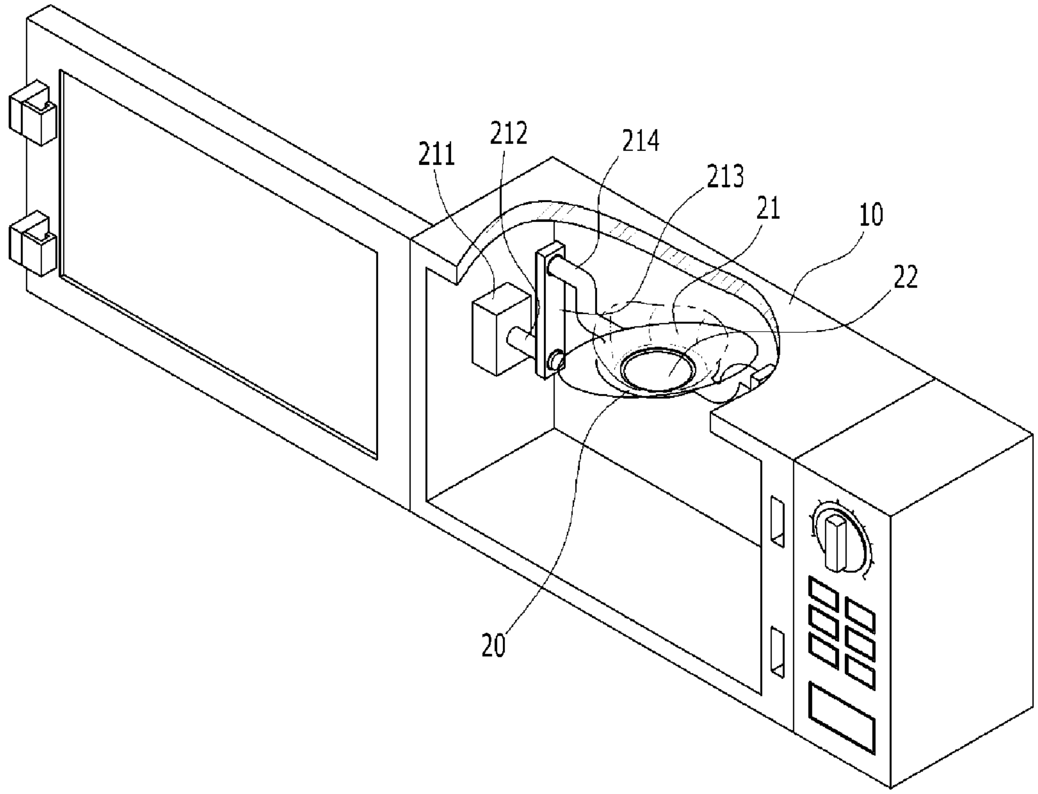
FIG. 5 is a diagram illustrating an exemplary operating status of a microwave range according to embodiments of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

One or more embodiments of the present disclosure will be described in detail hereinafter with reference to the accompanying drawings, in which one or more exemplary embodiments of the disclosure can be easily determined by those skilled in the art. As those skilled in the art will realize, the described exemplary embodiments may be modified in various different ways, all without departing from the spirit or scope of the present disclosure, which is not limited to the exemplary embodiments described herein. A configuration and operational effect according to exemplary configurations of the present disclosure will be clearly understood through the detailed description below. Like reference numbers designate like elements throughout the drawings and specification. A detailed explanation of known related functions and constitutions may be omitted when the detailed explanation obscures the subject matter of the present disclosure.

It is noted that the drawings are schematic and are not dimensionally illustrated. A relative size and a ratio of parts in the drawings may be exaggerated or reduced for clarity and convenience in the drawings and an arbitrary size is illustrative but is not restrictive. The same reference numerals designate the same structures, elements, or parts illustrated in two or more drawings in order to exhibit similar characteristics.

The exemplary embodiments of the present disclosure describe ideal exemplary embodiments of the present disclosure. As a result, various modifications of the drawings are expected. Accordingly, the exemplary embodiments are not limited to a specific form of the illustrated region, and for example, include modifications of form by manufacturing.

A microwave range 101 according to embodiments of the present disclosure will be described with reference to FIGS. 1 to 5.

As illustrated in FIGS. 1 to 5, the microwave range 101 according to embodiments of the present disclosure include a main body 10 and a tray unit 20.

The main body 10 includes a cooking chamber at one side and control devices for cooking food at another side.

The main body 10 may comprise a rectangular case, but is not limited thereto. The internal case of the main body generally has dimensions (e.g., height, width, and depth) sufficient to accommodate full (e.g., 360°) rotation of the tray unit 20. If necessary, the shape of the main body 10 may vary.

The tray unit 20 is in the cooking chamber in the main body 10. The tray unit 20 is configured to rotate one or more cooking objects (e.g., food) on a first plane and a second plane that is orthogonal to the first plane.

The first plane and the second plane are virtual planes for explaining the rotation of the tray unit 20. Specifically, the second plane refers to a virtual surface that is parallel to a lower surface (e.g., a bottom) of the cooking chamber in the main body 10, and the first plane refers to a virtual surface that is orthogonal to the second plane. A first tray 21 rotates vertically on the first plane in a circular motion (e.g., similar to a Ferris wheel). A second tray 22 rotates horizontally on the second plane.

The tray unit 20 includes the first tray 21 that rotates on the first plane and the second tray 22 that rotates on the second plane. The first and second trays 21, 22 are configured to be in an upright position (e.g., planar to the bottom and upper surface of the cooking chamber, to prevent food from spilling during rotation of the tray unit 20.

The second tray 22 may be inserted or placed on in the first tray 21. Specifically, the edge(s), periphery, or sides of the second tray 22 may have a step portion. As a result, the step portion(s) of the second tray 22 may be inserted into a guiding groove in an inner circumferential surface of the first tray 21. Alternatively, the first tray 21 may have one or more steps that are complementary to the step portion(s) of the second tray 22, on which periphery of the second tray 22 (including wheels 221) may be placed.

In this case, the shape of the guiding groove according to embodiments of the present disclosure may be U-shaped or C-shaped, but is not limited thereto, and may be varied depending on design choices of those skilled in the art.

A driving unit 200 is configured to vertically and/or horizontally rotate the first tray 21 and the second tray 22.

The driving unit 200 includes a first driving device 210 configured to rotate the first tray 21, and a second driving device 220 configured to rotate the second tray 22.

Specifically, a pair of first driving devices 210 are at opposed sides of the main body 10 to maintain a balance, so that the tray 21 does not lean towards one side of the cooking chamber.

The first driving device 210 includes a driving motor 211, a driving shaft 212, a first link 213, and a second link 214.

The driving motor 211 provides rotational power to the first tray 21. Various types of motors are known to those skilled in the art that may be used as the driving motor 211, but a step motor may be used to control an angle when the first tray 21 rotates. The step motor is driven at a low rotation rate (e.g., RPM) for controlling the angle of the first tray 21 at every stage during its rotation on the first plane.

The driving shaft 212 is connected to the driving motor 211.

One end of the first link 213 is coupled to the driving shaft 212 at a right angle.

One end of the second link 214 is rotatably coupled to another end of the first link 213, and another end of the second link 214 is coupled to the first tray 21. The second link 214 and the first tray 21 may be integral with each other, or individually formed and to be coupled to each other. The tray unit (which may comprise a support ring with a slot along the inner edge) may be welded to the second link 214 (e.g., which may comprise a support rod). This may vary, depending on design choices of those skilled in the art.

To rotate the first link 213 and the second link 214, a bearing 215 is between the first link 213 and the second link 214.

The bearing 215 according to embodiments of the present disclosure may include a plurality of ball bearings, but is not limited thereto. If the bearing 215 is a plurality of ball bearings, the first link 213 and the second link 214 rotate to prevent energy loss due to frictional force that, which may be otherwise caused between the first link 213 and the second link 214.

The second driving device 220 includes wheels 221 and a rotary motor 222.

The wheels 221 are at edges, sides, or a periphery of the second tray 22, and are configured to rotate the second tray 22. The wheels 221 are on or coupled to the stepped or extended (e.g., at the extension of the edges or sides) of the second tray 22, configured to rotate around the steps, periphery, or extended portion of the edges. The wheels 221 (of which there may be at least 4, 6, 8, or more) support the weight of the second tray 22 to maintain a balance of the second tray 22.

The rotary motor 222 rotates the second tray 22. Specifically, the rotary motor 222 is below the second tray 22. Accordingly, the rotary motor 222 supplies rotation power to rotate the second tray 22 having the wheels 221 at edges, sides, or a periphery thereof. For example, the motor 222 may directly drive or rotate a shaft coupled to a ring, plate or disc in or inside the second tray 22 (e.g., below or including the uppermost surface of the second tray 22), which is in turn in contact with an uppermost surface of the wheels 221, thereby rotating the second tray 22.

The rotary motor 222 according to embodiments of the present disclosure includes a battery that serves as a switch. The rotary motor 222 is not in close contact with the lower surface (e.g., bottom) of the cooking chamber. Rather, the rotary motor 222 is a predetermined interval or distance from the lower surface. Therefore, a battery may be used to operate the rotary motor 222 instead of a separate switch.

An operation process of the microwave range 101 with the above-described configuration will be described.

Rotation power of the driving motor 211 is transmitted to the first link 213. The bearing 215 is coupled between one end of the second link 214 that is integral with or separate from the first tray 21 and the first link 213. The first link 213 and the second link 214 are configured to rotate the tray unit 20 in the vertical direction, similar to a Ferris wheel.

The second tray 214 is maintained horizontally by its own weight.

The second tray 214 is horizontally rotated by the wheels 221 and the rotary motor 222 (which is configured to rotate the wheels 221).

Food placed on the tray unit 20 is heated by microwaves that are radiated into the microwave range 101, and the first tray 21, that rotates in the vertical direction to eliminate or reduce deviations in radiation density between the upper portion and the lower portion of the cooking chamber to evenly cook the food. Embodiments of the present disclosure may include a plurality of tray units, driving shafts, and links, (e.g., 2, 4, 6, etc.) arranged in a Ferris wheel-like configuration. The second tray of each tray unit may have separate driving unit. For example, each of the plurality of the driving devices may include a driving motor, driving shaft, and first and second links.

A microwave range 102 according to various embodiments of the present disclosure will be described with reference to FIG. 6.

Figure 6:
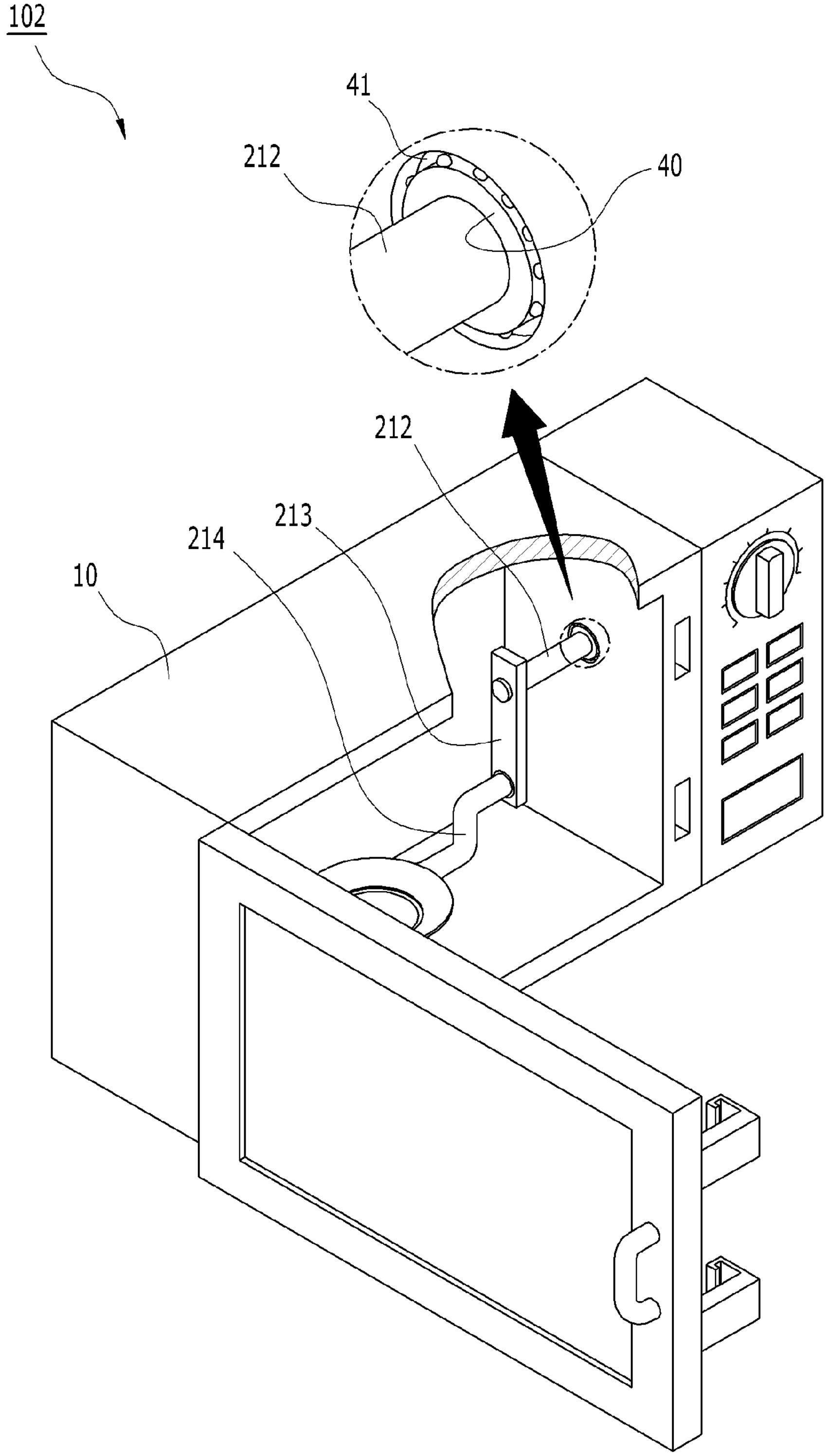
FIG. 6 is a perspective view illustrating an exemplary microwave range according to embodiments of the present disclosure.

As illustrated in FIG. 6, the microwave range 102 has the same configuration as the microwave range 101, except for the driving motor 211.

As described above, a first driving device 210 is at one side of a tray unit 20, and a second link 214, a first link 213, and a driving shaft 212 are sequentially coupled to another end of the tray unit 20.

The driving shaft 212 is in a guiding hole 40 that is on a sidewall of the cooking chamber. A rotational member 41 is between the guiding hole 40 and the driving shaft 212, configured to rotate the driving shaft 212 that is in the guiding hole 40.

The rotational member 41 is provided so that the guiding hole 40 may have a larger diameter than the diameter of the driving shaft 212.

The rotational member 41 may include a type of bearing that is known to those skilled in the art. The rotational member 41 according to various embodiments of the present disclosure may comprise a ball bearing.

Therefore, the rotation power is transmitted to the driving shaft 212, the first link 213, and the second link 214 by the rotation power of the driving motor 210 that is at one side of the tray unit 20. The rotation power may also be transmitted to the second link 214, the first link 213, and the driving shaft 212 at the opposite end of the tray unit 20, so that the tray unit 20 vertically rotates.

The microwave ranges 101 and 102 according to embodiments of the present disclosure include the tray unit 20 that is configured to simultaneously rotate in a vertical direction and a horizontal direction, so that the deviations in heating between the upper portion and the lower portion of the food decreases, and thus improving the cooking result.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A microwave range, comprising:

a main body having a cooking chamber therein;

a tray unit in the cooking chamber, the tray unit comprising a first tray that rotates on a first plane, and a second tray placed in the first tray that rotates on a second plane; and a driving unit configured to drive the first tray and the second tray, wherein the driving unit comprises:

a first driving device configured to rotate the first tray, wherein the first driving device comprises:

a driving motor that provides power to the first tray;

a driving shaft coupled to the driving motor;

a first link having one end coupled to the driving shaft at a right angle; and a second link having two horizontal bars and a vertical bar between the two horizontal bars, and rotatably coupled to another end of the first link, wherein the tray unit is configured to rotate food on the first plane and the second plane, the second plane being orthogonal to the first plane, wherein the tray unit is configured to simultaneously rotate in a vertical direction and in a horizontal direction while maintaining the first and second trays in an upright position during rotation.

2. The microwave range of claim 1, wherein the second tray has ends, edges, or a periphery with a step or an extended portion, and the step or extended portion is configured to be inserted in or placed on or over the first tray.

3. The microwave range of claim 1, wherein the driving unit further comprises a second driving device configured to rotate the second tray.

4. The microwave range of claim 3, wherein the second driving device comprises:

wheels at edges, sides, or the periphery of the second tray, configured to rotate the second tray.

5. The microwave range of claim 4, wherein the wheels are coupled to the extended portion and/or step of the second tray.

6. The microwave range of claim 4, wherein the wheels are configured to rotate around an extended portion and/or step of the second tray.

7. The microwave range of claim 4, wherein the wheels are configured to support the second tray and maintain a balance of the second tray.

8. The microwave range of claim 4, wherein the second driving device comprises a rotary motor configured to provide rotational power to the second tray.

9. The microwave range of claim 8, wherein the rotary motor is below the second tray.

10. The microwave range of claim 8, wherein the rotary motor further comprises a battery.

11. The microwave range of claim 8, wherein the rotary motor is a predetermined interval or distance from a lowermost surface of the cooking chamber.

12. The microwave range of claim 1, further comprising a pair of driving shafts, first links, and second links at opposed sides of a cooking chamber in the main body.

13. The microwave range of claim 1, further comprising a bearing configured to rotate the first link and the second link.

14. The microwave range of claim 13, wherein the second link is integral with or separate from the first tray or the first link.

* * * * *